United States Patent [19]
Hironaka et al.

[11] Patent Number: 6,092,387
[45] Date of Patent: Jul. 25, 2000

[54] AIR CONDITIONER WITH ELECTRIC DUST COLLECTOR

[75] Inventors: Yasumasa Hironaka; Takao Sakaue, both of Daito, Japan

[73] Assignee: Funai Electric Co., Ltd., Osaka, Japan

[21] Appl. No.: 09/251,804

[22] Filed: Feb. 17, 1999

[30] Foreign Application Priority Data

Feb. 19, 1998 [JP] Japan .................................. 10-036939

[51] Int. Cl.[7] .................................................. F25D 17/04
[52] U.S. Cl. .................................. 62/317; 96/15; 96/96
[58] Field of Search .............................. 62/317, 78, 264; 96/15, 74, 96

[56] References Cited

U.S. PATENT DOCUMENTS 5,290,343  3/1994  Morita et al. .......................... 96/96 X
5,529,613  6/1996  Yavnieli ................................ 85/96 X

FOREIGN PATENT DOCUMENTS 58-55058   4/1983  Japan .
58-88045   5/1983  Japan .
363127043  5/1988  Japan .
410332165  12/1998 Japan .

*Primary Examiner*—William Doerrler
*Assistant Examiner*—Chen-Wen Jiang
*Attorney, Agent, or Firm*—Lackenbach Siegel

[57] ABSTRACT

An air conditioner includes an electric dust collector arranged between an evaporator and a heat shield plate. This electric dust collector includes a discharge electrode and a dust collecting electrode. The discharge electrode is applied with a positive polarity of high direct current voltage from a high voltage power source, while the dust collecting electrode is supplied with a negative polarity of high direct current voltage. Accordingly, the dust charged through plus electric discharge by the discharge electrode is attracted onto the dust collecting electrode or a casing thereof.

4 Claims, 3 Drawing Sheets

AIR CONDITIONER WITH ELECTRIC DUST COLLECTOR

BACKGROUND OF THE INVENTION

1. Field of the Invention

The present invention relates to an air conditioner with electric dust collector, and more particularly to an air conditioner which, for example, is fixed in a room interior and provided with an electric dust collector having discharge and dust collecting electrodes.

2. Description of the Prior Art

There is disclosed one example of a conventional electric dust collector in Japanese Patent Publication No. S58-55058 [B03C3/41, B03C 3/66]. In this electric dust collector, a high direct current voltage in negative polarity is applied to the discharge electrode while a high direct current voltage in positive polarity is applied to the dust collecting electrode. That is, minus electric discharge enables collection of dust even if it is high in electrical resistivity.

This prior art, employing the minus discharge technique, is high in efficiency in collecting the dust. However, discharge electrons cause oxygen to be charged in minus, causing active oxygen or ozone. Active oxygen and ozone are considered by no means harmless because they might induce a problem, particularly in health, to human bodies.

Meanwhile, where such an electric dust collector is incorporated within an air conditioner, the discharge and dust collecting electrodes are usually positioned at such locations where cleaning is possible for the electrode from external whenever the dust collecting electrode requires cleaning.

SUMMARY OF THE INVENTION

Therefore, it is a primary object of the present invention to provide a novel air conditioner with electric dust collector.

It is another object of the present invention to provide an air conditioner with electric dust collector which has an electric dust collector that can be arranged even within a narrow space and one in which is not harmful to the human body.

An air conditioner according to the present invention, comprises: a housing having a back plate supported by a mount member and air intake port and an air outlet port; a heat exchanger arranged within the housing; an electric dust collector arranged between the heat exchanger and the back plate and having a discharge electrode and a dust collecting electrode; and a high voltage power source for supplying a first polarity of a high direct current voltage to the discharge electrode and a second polarity of a high direct current voltage to the dust collecting electrode.

The housing back plate is supported by a mount member through which the housing is fixed on a wall surface. The electric dust collector is arranged between the heat exchanger and the back plate. In a dust collecting mode, the discharge electrode of the electric dust collector is supplied with a first, e.g., positive, polarity of high direct current voltage, while the dust collecting electrode thereof is given with a second, e.g., negative, polarity of high direct current voltage. Accordingly, the dust is collected through plus electric discharge.

In the case of providing a heater onto the dust collecting electrode, in a restoring mode the dust collected on the electrode is oxidized and decomposed by the heater heat. In this case, however, a heat shield plate is preferably provided close to the back plate in order to shield the heat and further the dust collecting electrode is positioned between the heat exchanger and the heat shield plate.

Also, the heat shield plate is in a state of electrically floating.

In either case, the high voltage power source supplies to the discharge and dust collecting electrodes a voltage having a magnitude that a discharge current flows through between the discharge electrode and the dust collecting electrode but no discharge current flows between the discharge electrode and the heat exchanger.

According to the present invention, the dust collecting discharge voltage given between the discharge electrode and the dust collecting electrode is shared by positive and negative polarities of direct voltages. It is accordingly possible to provide an electric dust collector at a narrow space within the housing without inducing unwanted electric discharge (current leak) between the discharge electrode and the heat exchanger. Furthermore, dust collection is through plus electric discharge and therefore harmless for human bodies with less producing ozone or the like.

Also, the dust collecting electrode, if added with a self-cleaning function to oxidize and decompose dust, eliminates the necessity of manually implementing cleaning.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
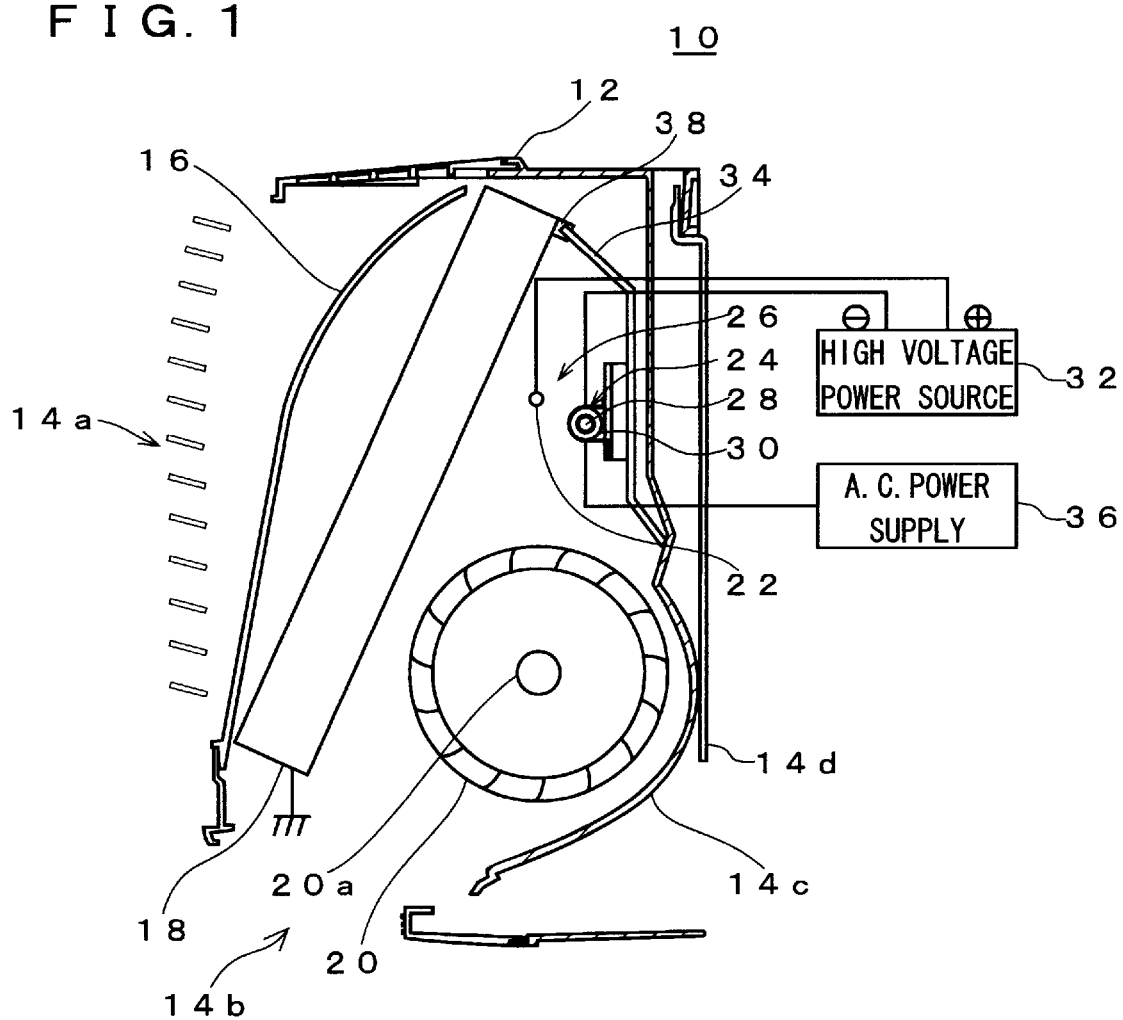
FIG. 1 is an illustrative view showing one embodiment according to the present invention.

Referring to FIG. 1, an air conditioner 10 with electric dust collector in this embodiment includes a housing 12. The housing 12 is formed of a synthetic resin, such as a plastic resin. This housing 12 has openings 14a and 14b in its front face. The opening 14a serves as an air intake port while the opening 14b at beneath the opening 14a as an air outlet port. The opening 14a and 14b are hereinafter referred, respectively, to as air intake port and air outlet port. Also, the housing 12 is formed with a back plate 14c which is held by a mount member 14d for mounting on a not-shown wall surface. This structure makes the housing 12 to be mounted on the wall surface.

A filter 16 is detachably provided between the air intake port 14a and a heat exchanger (evaporator) 18 in a manner covering over the air intake port 14a. The filter 16 is formed of a filter fiber, such as a glass fiber or plastic fiber. An evaporator 18 is arranged on the back side of the filter 16 within the housing 12 so that it can exchange heat of the air introduced through the air intake port 14a into the housing 12. The evaporator 18 is connected to the ground. A cross flow fan 20 is arranged at a location further behind the evaporator 18 and deep inward the air outlet port 14b so that the cross flow fan 20 rotates about a rotation axis 20a. By providing rotation to this cross flow fan 20, an air stream is created extending from the air intake port 14a through the evaporator 18 to the air outlet port 14b and spreading widthwise (in rotation axis 20a direction).

Further, an electric dust collector 26 is provided within the housing 12. The electric dust collector 26 includes a discharge electrode 22 and a dust collecting electrode 24 which are held spaced at a constant distance (1.5 cm in this embodiment) relative to each other. The discharge electrode 22 is made up of a steel wire, stainless wire or tungsten wire, and extends in a width direction (rotation axis 20a direction) of the air conditioner 10 with electric dust collector. The dust collecting electrode 24, on the other hand, includes a heater 28 made in a rod form. This heater 28 is accommodated within a casing 30 that is generally in a cylindrical form and coated with a ceramics layer through a catalyst. A high voltage power source 32 is connected to the electric dust collector 26 thereby enabling dust collection. The dust collecting electrode 24 is mounted on a heat shield plate 34. The heat shield plate 34 is in contact with the evaporator 18 through an insulation member 38, and secured to the housing 12 of an insulation material. Due to this, the heat shield plate 34 is kept in a state of electrically floating. Immediately after starting electric discharge by the discharge electrode 22, the discharge is slightly effected toward the heat shield plate 34. However, the discharge to the heat shield plate 34 almost ceases in a brief time because saturation is reached by the heat shield plate 34 and further the difference in discharge voltage is small.

Figure 2:
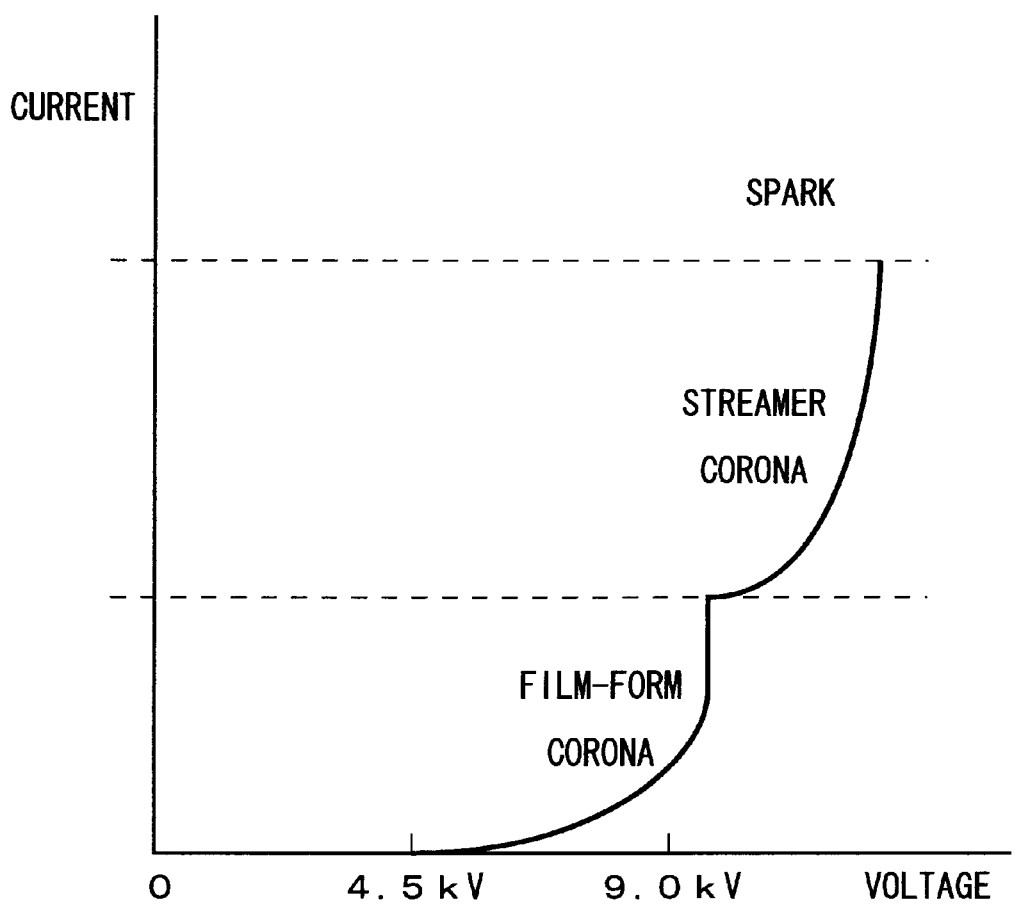
FIG. 2 is a graph showing an electric current against a gap voltage in an unequal electric field.

A high direct current voltage in a positive polarity (+4.5 kV in this embodiment) is supplied from the high voltage power source 32, while a negative polarity high direct current voltage (−4.5 kV in this embodiment) is given to the dust collecting electrode 24. In this manner, the high direct current voltage shared by the positive and negative polarities makes it possible to decrease the difference in voltage between each electrode and the ground. This can prevent abnormal discharge from occurring at a position other than between the electrodes. The high voltage power source 32 of this embodiment has a voltage value as shown in FIG. 2 which is expectable from a curve of a current characteristic vs. a gap voltage in an unequal electric field. That is, no discharge current appears at 4.5 kV or below. At around 9.0 kV a film-formed corona discharge takes place providing stable discharge currents. However, the humidity within the air conditioner 10 is comparatively high. It is possible to deduce, through experiments, a distance between the discharge electrode 22 and the dust collecting electrode 24, as well as a voltage value of the high voltage power source 32. Thus, electric discharge can be caused only between the discharge electrode 22 and the dust collecting electrode 24, enabling efficient dust collection. Incidentally, in this embodiment the positive and negative polarity high direct current voltages were set the same in absolute value. However, these voltages may be set in different values provided that the potential difference between them be given around 9.0 kV. Meanwhile, the heater 28 within the dust collecting electrode 24 is connected to an alternate current power source 36 as a commercial power supply (100V) by which power is given to the heater 28.

Figure 3:
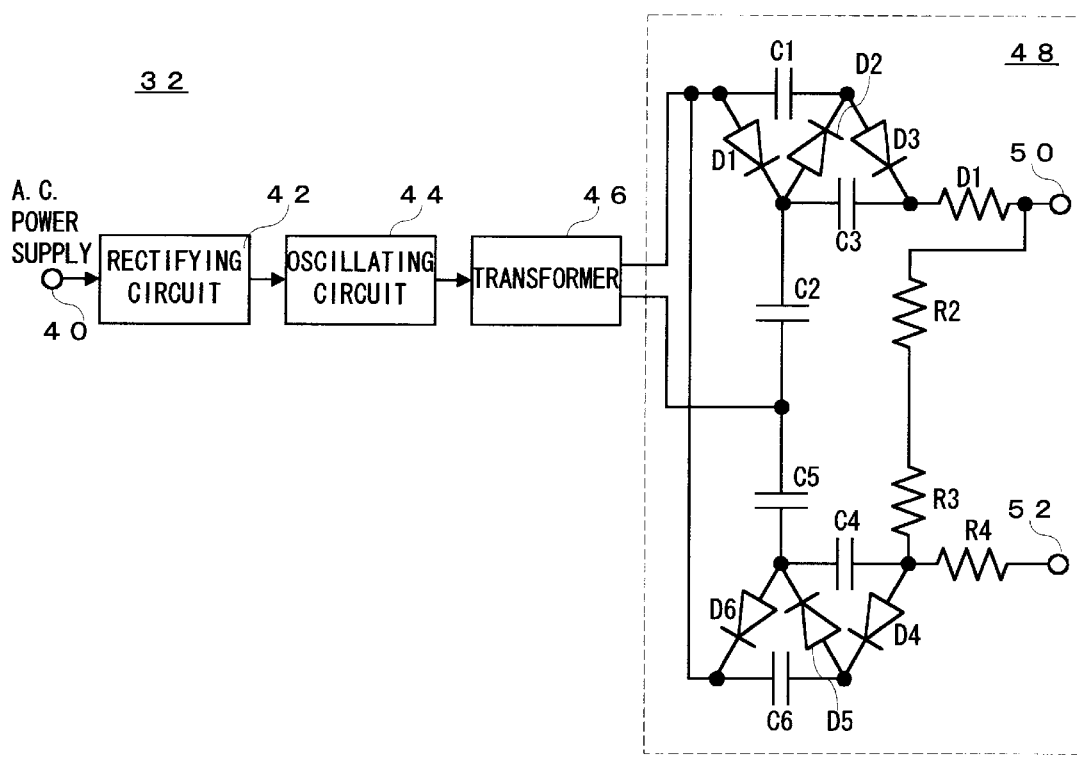
FIG. 3 is an illustrative view showing a high voltage power source.

Explaining in detail on the high voltage power source 32, the high voltage power source 32 shown in FIG. 3 includes an input terminal 40 via which an alternate current voltage is applied. The alternate current voltage supplied through the input terminal 40 is inputted to a rectifying circuit 42 where the voltage is subjected to rectification. That is, the alternate current voltage is converted into a direct current voltage. This direct current voltage is delivered to an oscillation circuit 44 whereby the oscillation circuit 44 is oscillated at a predetermined frequency. This oscillation current is given to a transformer 46 where it flows through a primary coil thereof. Due to this, a radio frequency high voltage is outputted from a secondary side of the transformer 46 in proportion to the ratio in the number of windings of the primary to secondary coil. This output is boosted and rectified by a multiple step-up rectifying circuit 48, providing direct current high voltages with positive and negative polarities onto respective high voltage output terminals 50 and 52.

In a dust collecting mode, a positive polarity high direct current voltage (+4.5 kV) is supplied to the discharge electrode 22 from a positive voltage output terminal 50 of the high voltage power source 32 while a negative polarity high direct current voltage (−4.5 kV) is supplied to the dust collecting electrode 24 from a negative voltage output terminal 52. This causes a potential difference of approximately 9.0 kV between the discharge electrode 22 and the dust collecting electrode 24, producing electric discharge between these electrodes. Thus, the dust electrically charged by the discharge electrode 22 is attracted to the dust collecting electrode 24. In a restoring mode, the high voltage power source 32 is turned off and the heater 28 is applied by an alternate current voltage (AC100V) from the alternate current power source 36. Consequently, the casing 30 (dust collecting electrode 24) at its surface is heated up, for example, to 200 to 350° C. By thus heating, the dust collected over the surface of the casing 30 is subjected to oxidation and decomposition into water and carbon dioxide. In other words, this dust collecting electrode 24 has a function of self-cleaning. If a control circuit (not shown) such as a micro-computer is employed to switch between the high voltage power source 32 and the alternate current power supply 36, and accordingly between the dust collecting mode and the reproduce mode, the dust collectability can be kept high for a long term.

According to this embodiment, a high direct current voltage in a positive polarity is applied to the discharge electrode 22 while a high direct current voltage in a negative polarity is to the dust collecting electrode 24. This can decrease the difference of voltage between each electrode and a position other than those. Therefore it is possible to arrange an electric dust collector 26 in such a narrow space as between the evaporator 18 and the heat shield plate 34.

Also, the electric dust collector 26 is made to effect plus discharge without producing ozone or the like, thus doing no harm to the human body. In the above embodiment, the discharge electrode 22 is supplied by a positive polarity voltage and the dust collecting electrode 24 is by a negative polarity voltage. However, the polarity for each electrode may be set reverse to that of the embodiment.

It should be noted that in this Specification the "direct current voltage" covers in concept not only a constant value voltage but also a pulsating or pulse voltage having a voltage value varying in one polarity.

Although in this embodiment the high voltage power source 32 and the alternate current power supply 36 were provided outside the air conditioner 10 with electric dust collector in the figure, these high voltage power source 32 and alternate current power supply 36 may be arranged within the air conditioner 10 with electric dust collector.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An air conditioner, comprising:
a housing having a back plate supported by a mount member and air intake port and an air outlet port:
a heat exchanger arranged within said housing:
an electric dust collector arranged between said heat exchanger and said back plate and having a discharge electrode and a dust collecting electrode;

a high voltage power source for supplying a first polarity of a high direct current voltage to said discharge electrode and a second polarity of a high direct current voltage to said dust collecting electrode; and wherein said dust collecting electrode has a heater coated with a catalyst for effecting oxidation and decomposition, a heat shield plate provided in the vicinity of said back plate to field heat from said heater, and said dust collecting electrode being positioned between said heat exchanger and said heat shield plate.

2. An air conditioner according to claim 1, wherein said heat shield plate is in a state of electrically floating.

3. An air conditioner according to claim 1, where said high voltage power source supplies to said discharge and dust collecting electrodes a voltage having a magnitude that a discharge current flows through between said discharge electrode and said dust collecting electrode but no discharge current flows between said discharge electrode and said heat exchange.

4. An air conditioner according to claim 2, where said high voltage power source supplies to said discharge and dust collecting electrodes a voltage having a magnitude that a discharge current flows through between said discharge electrode and said dust collecting electrode but no discharge current flows between said discharge electrode and said heat exchange.

* * * * *